United States Patent
Wang et al.

(10) Patent No.: US 8,108,343 B2
(45) Date of Patent: Jan. 31, 2012

(54) DE-DUPLICATION AND COMPLETENESS IN MULTI-LOG BASED REPLICATION

(75) Inventors: Rui Wang, Redmond, WA (US); Qun Guo, Bellevue, WA (US); Yixue Zhu, Sammamish, WA (US); Michael E. Habben, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 292 days.

(21) Appl. No.: 12/428,495

(22) Filed: Apr. 23, 2009

(65) Prior Publication Data

US 2010/0274768 A1    Oct. 28, 2010

(51) Int. Cl.
G06F 7/00 (2006.01)
G06F 17/00 (2006.01)

(52) U.S. Cl. .................................. 707/625; 707/676

(58) Field of Classification Search .................. 707/625, 707/676, 999.204
See application file for complete search history.

(56) References Cited

U.S. PATENT DOCUMENTS

| | | | |
|---|---|---|---|
| 6,226,650 B1 * | 5/2001 | Mahajan et al. | 707/625 |
| 6,567,823 B1 * | 5/2003 | Rothschild | 707/999.104 |
| 7,099,897 B2 | 8/2006 | Huras et al. | |
| 7,257,690 B1 * | 8/2007 | Baird | 711/162 |
| 2002/0073285 A1 * | 6/2002 | Butterworth | 711/154 |
| 2002/0120791 A1 * | 8/2002 | Somalwar et al. | 709/330 |
| 2005/0010588 A1 | 1/2005 | Zalewski et al. | |
| 2006/0090095 A1 * | 4/2006 | Massa et al. | 714/4 |
| 2008/0133623 A1 | 6/2008 | Tsuchida et al. | |
| 2008/0140734 A1 | 6/2008 | Wagner | |
| 2008/0243769 A1 * | 10/2008 | Arbour et al. | 707/999.002 |
| 2008/0306907 A1 | 12/2008 | Biswal et al. | |
| 2009/0235232 A1 * | 9/2009 | Malik et al. | 717/120 |
| 2009/0248727 A1 * | 10/2009 | Hughes | 707/999.1 |

OTHER PUBLICATIONS

Tsien, et al., "Logminer, Flashback Query and Online Redefinition: Power Tools for DBAS", Retrieved at <<http://www.oracle.com/technology/deploy/availability/pdf/32494_OW2002_WP.pdf>>, Oracle9i Database, Paper No. 32494, pp. 12.

Hupfeld, Felix, "Log-Structured Storage for Efficient Weakly-Connected Replication", Retrieved at <<http://www.storagebox.org/private/felix/hupfeld-log_structured_storage_for_efficient_replication.pdf>>, pp. 6.

"EnterpriseDB Replication", Retrieved at <<http://docs.huihoo.com/enterprisedb/8.1/edb-replication.html>>, Feb. 27, 2009, pp. 19.

"Oracle Advanced Compression", Retrieved at <<http://www.oracle.com/technology/products/database/oracle11g/pdf/advanced-compression-whitepaper.pdf>>, An Oracle White Paper, Apr. 2008, pp. 13.

* cited by examiner

*Primary Examiner* — Apu Mofiz
*Assistant Examiner* — Bryan Walker
(74) *Attorney, Agent, or Firm* — Zete Law, P.L.L.C.; MacLane C. Key

(57) ABSTRACT

Aspects of the subject matter described herein relate to multi-log based replication. In aspects, database fragments are associated with different logs. Each change to a duplicated database record may be recorded in multiple logs. A history data structure is used to determine when duplication schemas are valid. A duplication schema indicates what database fragments duplicate one or more database records. For a particular time range, the duplication schema history is used to determine whether currently available logs include all changes. If multiple logs include the same change, one log may be selected to provide the change. Non-duplicative changes may be placed into a single data stream usable to update a remote database.

20 Claims, 6 Drawing Sheets

DE-DUPLICATION AND COMPLETENESS IN MULTI-LOG BASED REPLICATION

BACKGROUND

In an effort to make a database more scalable, available, and failure-resistant, the database may be hosted on multiple nodes each of which hosts zero or more fragments of the database. Different tables of a database may be distributed on different database fragments and different data records of the same table may be distributed on different database fragments.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to multi-log based replication. In aspects, database fragments are associated with different logs. Each change to a duplicated database record may be recorded in multiple logs. A history data structure is used to determine when duplication schemas are valid. A duplication schema indicates what database fragments duplicate one or more database records. For a particular time range, the duplication schema history is used to determine whether currently available logs include all changes. If multiple logs include the same change, one log may be selected to provide the change. Non-duplicative changes may be placed into a single data stream usable to update a remote database.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." Other definitions, explicit and implicit, may be included below.

Exemplary Operating Environment

Figure 1:
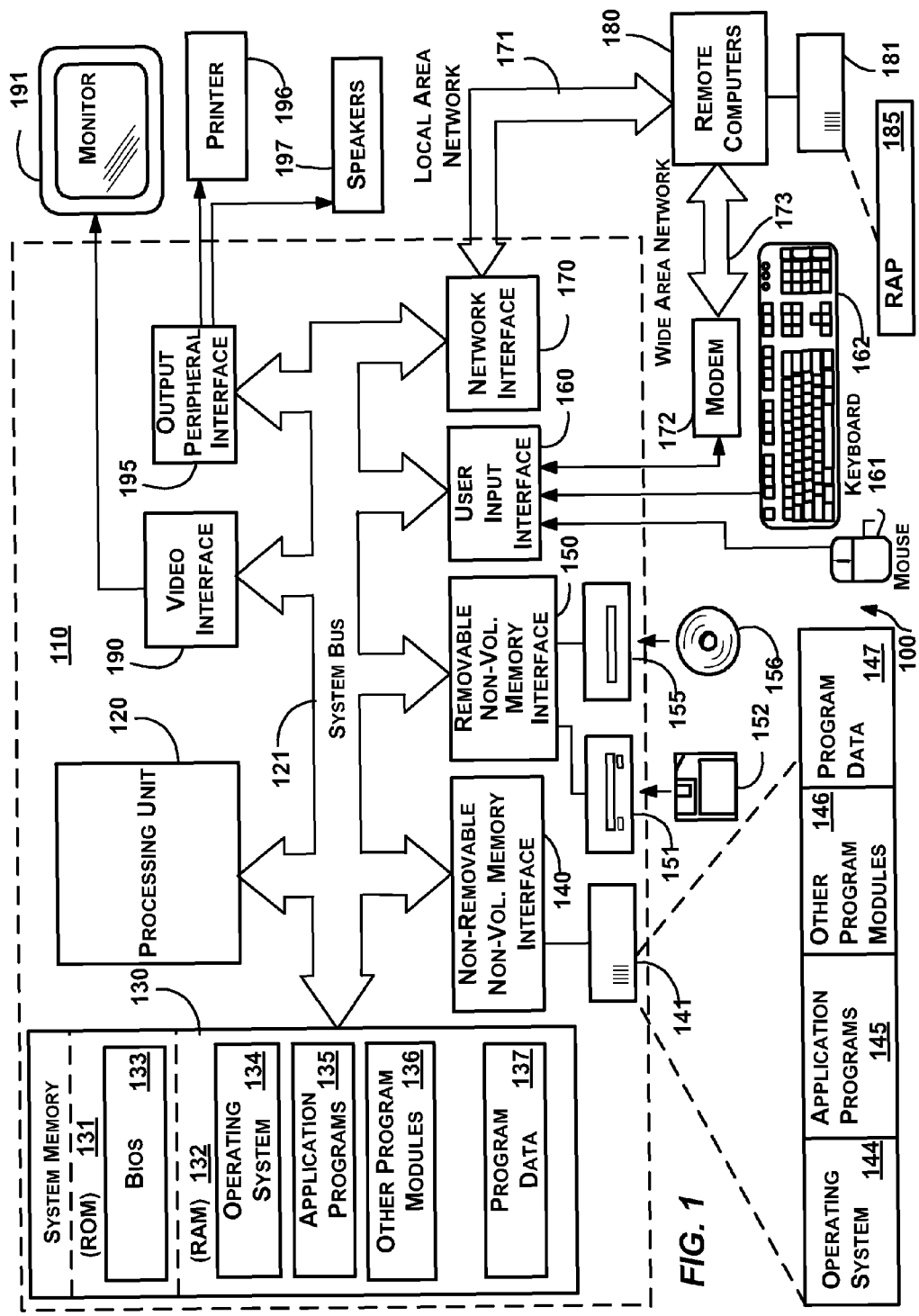
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus through a non-removable memory interface such as interface 140, and magnetic disk drive 151 and optical disc drive 155 are typically connected to the system bus by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Log Based Replication

As mentioned previously, a database may be hosted as fragments on multiple nodes. In addition, one or more records of the database may be duplicated in one or more fragments.

Figure 2:
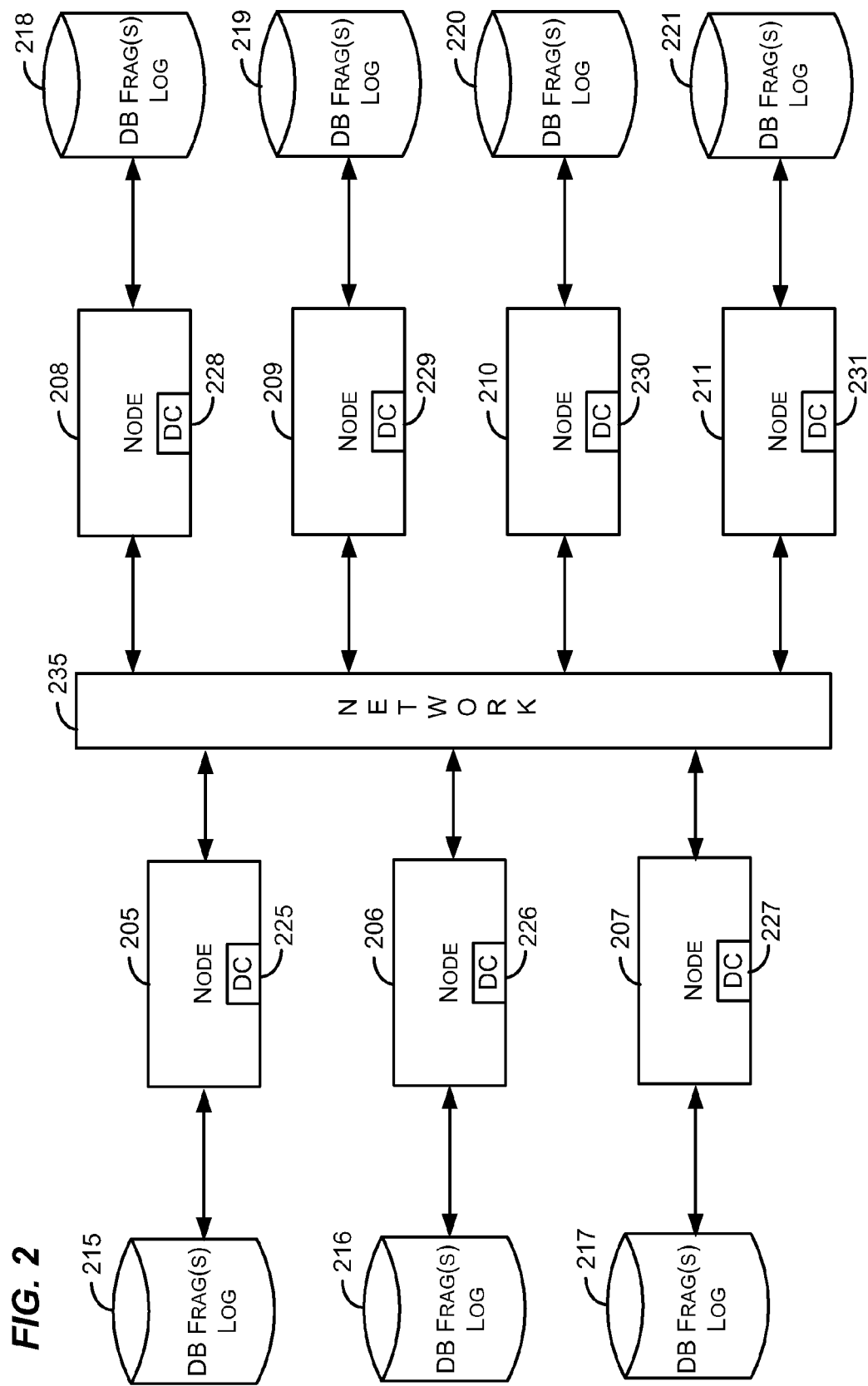
FIG. 2 is a block diagram representing an exemplary environment in which aspects of the subject matter described herein may be implemented.

FIG. 2 is a block diagram representing an exemplary environment in which aspects of the subject matter described herein may be implemented. The environment may include various nodes 205-211, stores 215-221, a network 235, and may include other entities (not shown). The nodes 205-211 may include database components 225-231. The various entities may be located relatively close to each other or may be distributed across the world. The various entities may communicate with each other via various networks including intra- and inter-office networks and the network 235.

In an embodiment, the network 235 may comprise the Internet. In an embodiment, the network 235 may comprise one or more local area networks, wide area networks, direct connections, virtual connections, private networks, virtual private networks, some combination of the above, and the like.

Each of the nodes 205-211 may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as a node comprises the computer 110 of FIG. 1.

The stores 215-221 comprise any storage media capable of storing data. The term data is to be read broadly to include anything that may be operated on by a computer. Some examples of data include information, program code, program state, program data, other data, and the like. A store may comprise a file system, database, volatile memory such as RAM, other storage, some combination of the above, and the like and may be distributed across multiple devices. A store may be external, internal, or include components that are both internal and external to the node to which the store is associated.

Data stored in the stores 215-221 may be organized in tables, records, objects, other data structures, and the like. The data may be stored in HTML files, XML files, spreadsheets, flat files, document files, and other files. Data stored on the stores 215-221 may be classified based on a model used to structure the data. For example, data stored on the stores 215-221 may comprise a relational database, object-oriented database, hierarchical database, network database, other type of database, some combination or extension of the above, and the like.

The stores 215-221 may be accessed via components of a database management system (DBMS). A DBMS may comprise one or more programs that control organization, storage, management, and retrieval of data in a database. For example a DBMS may have database components 225-231 that reside on the nodes 205-211, respectively. A DBMS may receive requests to access data in the database and may perform the operations needed to provide this access. Access as used herein may include reading data, writing data, deleting data, updating data, a combination including one or more of the above, and the like.

In describing aspects of the subject matter described herein, for simplicity, terminology associated with relational databases is sometimes used herein. Although relational database terminology is often used herein, the teachings herein may also be applied to other types of databases including those that have been mentioned previously.

Each store may include zero or more database fragments (sometimes referred to herein simply as "fragments"). A fragment may include one or more records of a database. In relational databases, a record may comprise a row of a table, for example. As used herein, a record is to be read broadly as to include any data that may be included in a database of any type.

In one embodiment, a store may store different fragments than the fragments that are stored on other stores. In another embodiment, one or more fragments may be replicated on two or more stores. When a fragment is replicated on two or more stores, when a data change occurs, the data change occurs to all copies of the fragment. Failure to change any copy may fail the whole data change and abort the whole transaction. In case a database fragment becomes unavailable and thus data record copies in this database fragment become inaccessible, copies of the data records may still be available on other database fragments Logically, each database fragment is associated with a transaction log. In implementation, one or more database fragments in a single store may share a transaction log or each database fragment may have its own transaction log.

Figure 3:
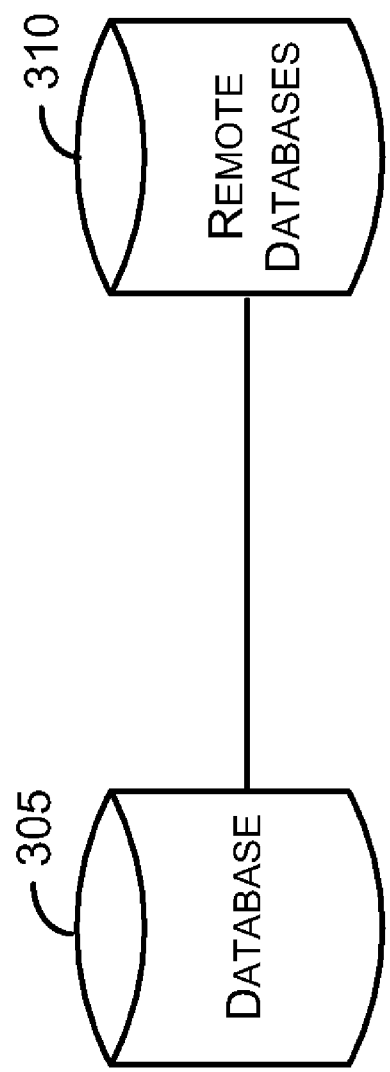
FIG. 3 is a block diagram that illustrates a database that is replicated to a remote database in accordance with aspects of the subject matter described herein.

A data change on a database fragment generates a log record(s) in the transaction log of the data fragment. Where a record is duplicated in multiple database fragments, a data change to the record may generate a log record in each of the transaction logs associated with the database fragments. FIG. 3 is a block diagram that illustrates a database that is replicated to a remote database in accordance with aspects of the subject matter described herein. Logically, the database 305 may comprise the combination of the database fragments stored in the stores 215-221 of FIG. 2.

To replicate data from the database 305 to the remote database(s) 310, one mechanism includes initializing the remote database(s) 310 to a consistent image of the database 305 and then sending a stream of changes that occur to the database 305 to the remote database(s) 310. The remote database(s) 310 may then apply the stream of changes to update the remote database(s) 310 data so that the remote database(s) 310 data stays up to date with the data on the database 305.

When multiple logs are involved in the source database where duplicate changes may be included in these logs, the duplicates need to be removed (or not used in the first place) in creating the stream of changes. Furthermore, to ensure that the remote database(s) 310 remain consistent with the database 305 up to a point in time, the changes in the stream of changes need to be complete up to that time.

Returning to FIG. 2, for simplicity in presentation, the following assumptions may be made without loss of generality:

1. All of the nodes 205-211 have the same logical time. For example, logical time may be managed by a central manager component and the nodes 205-211 may synchronize logical time with the manager. As another example, logical time may be embedded in components of the network 235 such that the nodes 205-211 are updated with the logical time.

2. The availability of a transaction log may be indicated by whether its corresponding database fragment is online. In some embodiments, transaction logs may be accessible even when their corresponding database fragments are offline.

3. Identifiers of entities from the same type are not re-used. If a database fragment goes offline and comes back online again, the database fragment's identifier does not change.

This case is not counted as re-use, since it is the same database fragment and its current log still contains the part which was generated before it became offline, if that part of the log has not been truncated yet.

In some embodiments, identifiers may be reused as long as there is some other information that may be used to uniquely identify the entities within their corresponding tables. For example, a logical timestamp may be associated with each identifier to uniquely identify entities in cases where identifiers may be re-used.

Replication of a database with multiple logs may begin with starting a log scanner on each available transaction log. Replication may be executed in logical time order, batch by batch. Each batch replicates data changes of transactions that were committed in a given logical time range. This logical time range is fed into all log scanners. Each log scanner extracts from its log the data changes in the given logical time range. Data changes exported from all log scanners may be merged to form a single data change stream before they are applied to the remote database. To detect whether logs of online database fragments contain all data changes in a given logical time range and to filter duplicates along with log scanning, a history of duplication schemas may be recorded.

A duplication schema indicates what database fragments duplicate one or more database records. A history of duplication schemas indicates the ranges of time each duplication schema is valid. Although many different data structures may be used to store a history of duplication schemas, a relational example is given herein.

In a relational database, a history of duplication schemas may be stored in a system table. This table is sometimes referred to herein as the DuplicationSchemaHistory table or simply as DuplicationSchemaHistory. DuplicationSchemaHistory may be defined with four columns: DuplicationSchemaID, SetOfDBFragmentIDs, StartTimeStamp, EndTimeStamp. A primary key may be defined on DuplicationSchemaID while indices may be defined on StartTimeStamp and EndTimeStamp, respectively.

For each row of the DuplicationSchemaHistory, the DuplicationSchemaID field includes an identifier that may be used to identify a duplication schema, the SetOfDBFragmentIDs field includes identifiers of fragments that are involved in duplicating one or more data records, the StartTimeStamp and EndTimeStamp fields indicate a period of time (i.e., between a logical start time and a logical end time) in which a particular duplication schema is valid. When the EndTimeStamp field is NULL, the duplication schema is still in use and valid. Duplication schema identifiers are not reused.

Data records from the same table or different tables of a database may share the same duplication schema. In one embodiment, when a duplication schema is followed for the first time by a data change, a record is inserted into DuplicationSchemaHistory with StartTimeStamp being filled. In case a database fragment goes offline, all existing duplication schemas whose SetOfDBFragmentID include the database fragment's ID are invalidated (with the EndTimeStamp field being filled), and all active transactions involving these duplication schemas are aborted. These duplication schemas that are invalidated may be re-inserted into DuplicationSchemaHistory again as long as they are inserted with new DuplicationSchemaIDs.

In most cases, duplication schemas may change infrequently, thus recording the history of duplication schemas presents only minor overhead. The data in the DuplicationSchemaHistory may be duplicated across multiple database fragments to reduce data loss in case of a node or disk failures and thus also follow one or more duplication schemas. The history of these duplication schemas does not need to be recorded as the DuplicationSchemaHistory need not be replicated to a remote database.

In one embodiment, before replicating data changes in a given logical time range, say, between BeginScanTimeStamp and EndScanTimeStamp, database components may check whether logs of currently online database fragments contain all data changes in the logical time range, in the following procedure. Below are some exemplary actions for doing this:

1. Get the ID set of database fragments needed, by the following exemplary SQL query,

```
Select SetOfDBFragmentIDs
  From DuplicationSchemaHistory
  Where StartTimeStamp <= EndScanTimeStamp and
    (EndTimeStamp >= BeginScanTimeStamp or EndTimeStamp
    is NULL);
```

2. Get the ID set of currently online database fragments; and
3. Compare the two sets to detect completeness.

For example, in one example DuplicationSchemaHistory may contain the following data,

| DuplicationSchemaID | SetOfDBFragmentID | StartTimeStamp | EndTimeStamp |
|---|---|---|---|
| 5 | {DBFrag1, DBFrag2} | 50 | 250 |
| 6 | {DBFrag2, DBFrag3} | 100 | NULL | and only the database fragment DBFrag2 may be online currently. Furthermore, in the example replication may be desired for all data changes in the logical time range between 150 and 200. The SQL query indicated above when performed against the exemplary DuplicationSchemaHistory above returns: {DBFrag1, DBFrag2}, {DBFrag2, DBFrag3}}.

When logs for (DBFrag1 or DBFrag2) and (DBFrag2 or DBFrag3) are online or otherwise available, this satisfied completeness. If DBFrag2 is online, the condition above is satisfied and thus available logs do contain all data changes between 150 and 200 for this example.

In another example, if only the database fragment DBFrag3, rather than DBFrag2, is online currently, the condition above is not satisfied. In this example, the available logs do not contain all data changes between 150 and 200.

The completeness detection mechanism above assumes that during the given logical time range, for any active duplication schema, there existed at least one data change that followed the duplication schema. If for a given logical time range, no data changes have occurred that followed the duplication schema, it may be falsely reported that the available logs do not contain all data changes in the given logical time range.

In the second example above, if only the database fragment DBFrag3 is online currently and if no data changes occurred between 150 and 200 that followed the duplication schema {DBFrag1, DBFrag2}, the available log (of the database fragment DBFrag3) actually does contain all data changes between 150 and 200. Thus, reporting incompleteness is false in this case. In case of a reported incompleteness, replication either waits until enough database fragments have come back online again, or is re-started after the remote database server is re-initialized with the current data of the replicated database.

In one embodiment, this detection imprecision may be reduced by recording for each duplication schema all the timestamps of data changes that followed the duplication schema. With this information, it can be determined whether a data change occurred during any given logical time range. Depending on implementation and particular usage, however, this embodiment may be undesirable as it may impose a larger runtime overhead. The overhead may be incurred as every data change needs to update the usage information of its duplication schema and because the storage of this usage information consumes space.

In another embodiment, aggregate usage information may be recorded and cached. For example, a most recent usage timestamp may be associated with duplication schemas, by adding a new column MostRecentUsageTimeStamp in DuplicationSchemaHistory. An in-memory data structure may be maintained to cache a set of (DuplicationSchemaID, MostRecentUsageTimeStamp). With every data change, its duplication schema's most recent usage timestamp is updated in the cache. Periodically or when the cache becomes full, the cached information may be written to the disk table DuplicationSchemaHistory. This cache can be located on some or all nodes. Querying the usage information of duplication schemas needs to query both the cache and DuplicationSchemaHistory.

Utilizing the most recent usage timestamp information, completeness detection may reduce false reports of incompleteness. For presentation simplicity, the following SQL statement may be assumed to query both the cache and DuplicationSchemaHistory.

```
Select SetOfDBFragmentIDs
    From DuplicationSchemaHistory
    Where StartTimeStamp <= EndScanTimeStamp and
        MostRecentUsageTimeStamp >= BeginScanTimeStamp
```

Only duplication schemas that were created no later than EndScanTimeStamp AND that were followed by data changes no earlier than BeginScanTimeStamp are used for completeness detection. A report of incompleteness means that at least one duplication schema's "OR" condition (i.e., between database fragments associated with the duplication schema) is not satisfied (FALSE) and at least one data change following this duplication schema occurred no earlier than BeginScanTimeStamp. If the "OR" condition is not satisfied for a duplication schema, this means that all database fragments associated with the duplication schema are offline.

In case MostRecentUsageTimeStamp is no greater than EndScanTimeStamp, then at least one data change following this duplication schema occurred between BeginScanTimeStamp and EndScanTimeStamp. In this case, the database fragments associated with the duplication schema are not available, and the available logs do not contain all data changes in the given logical time range.

In case MostRecentUsageTimeStamp is greater than EndScanTimeStamp, it is unknown whether a data change following this duplication schema occurred between BeginScanTimeStamp and EndScanTimeStamp. In this case, with the given data, the database replication mechanism is unable to tell whether available logs contain all data changes in the given logical time range. However, because MostRecentUsageTimeStamp is greater than EndScanTimeStamp, the database replication mechanism is able to know that a later data change (after EndScanTimeStamp) following this duplication schema occurred but that change information regarding this data change is not included in any currently available log. Unless logs become available, replication will be unable to continue eventually. In this case, incompleteness may be reported for the range between BeginScanTimeStamp and EndScanTimeStamp.

Since the most recent usage timestamps are recorded in cache first, if a node fails or becomes otherwise inoperable, the most recent usage timestamps in the cache may be lost before being written to DuplicationSchemaHistory. In this case, the most recent usage timestamps in DuplicationSchemaHistory may not be up-to-date. If this is not accounted for, it is possible to report completeness while the data changes are indeed incomplete. With a false report of completeness, replication may continue with possible data inconsistency at the remote database. Data inconsistency is a significant problem.

To address the possibility of node failure, after a cache is lost and before replication continues, any duplication schema that includes database fragments hosted on the node may be updated such that the MostRecentUsageTimeStamp in DuplicationSchemaHistory is set to the current logical timestamp, if its existing value is smaller. Doing this effectively "fakes" that a data change occurred for every affected duplication schema as of the current logical timestamp. With this "fake" data change, a database component may determine to report incompleteness when in fact the data changes are indeed complete. In many if not all implementations, however, falsely reporting incompleteness is better than falsely report completeness, since it does not potentially cause data inconsistency. To recover from this state, the remote database may be re-initialized to a snapshot of the database before replication via logs continues.

For de-duplicating entries regarding data changes in multiple logs, each log record for a data change may be associated with a logical timestamp. This may be done, for example, by including the timestamp in the log record, by including the timestamp in the corresponding transaction's commit log record, or by some other technique that associates a data change with the logical timestamp. To assist de-duplication, data change log records may also include the identifiers of the duplication schemas of the corresponding data records.

The result set of the following SQL query,

```
Select DuplicationSchemaID, SetOfDBFragmentIDs
    From DuplicationSchemaHistory
    Where StartTimeStamp <= EndScanTimeStamp and
        (EndTimeStamp >= BeginScanTimeStamp or EndTimeStamp
        is NULL);
``` includes the duplication schema identifiers and set of database fragment identifiers which could have been followed by data changes in the logical time range between BeginScanTimeStamp and EndScanTimeStamp. Once it is confirmed that available logs contain all data changes in this logical time range (e.g., through the completeness detection mentioned previously), this result set and the identifier set of currently online database fragments may be sent as parameters into the log scanner of each online database fragment. The log scanners may then filter duplicate data changes during log scanning using a DuplicateFilter function.

The DuplicateFilter function is any function that deterministically selects one of the currently online database fragments for a given duplication schema. The changes included in the log associated with the selected database fragment may then be exported by one log scanner only and exactly once.

For example, when the log scanner of a database fragment DBFragx encounters the log records of a data change, it behaves as follows:

1. First the log scanner takes the intersection of the set of database fragment IDs appearing in the duplication schema, and the ID set of currently online database fragments;

2. The DuplicateFilter function is then applied to the intersection to obtain a database fragment ID (e.g., ExportingDBFragID); and 3. If ExportingDBFragId is the same as DBFragx, the data change is extracted and exported; otherwise, the data change is not extracted or exported.

For example, the DuplicateFilter function may return the maximum ID given a set of IDs. A data change of a committed transaction may, for example, follow a duplication schema {DBFrag1, DBFrag2, DBFrag3} and when this data change is replicated, the currently online database fragment set may be {DBFrag1, DBFrag3, DBFrag4}. This means that the database fragment DBFrag2 is offline and that there is a newly added database fragment DBFrag4 or the database fragment DBFrag4 has come back online. The intersection of the two sets is {DBFrag1, DBFrag3} and Max({DBFrag1, DBFrag3}) is DBFrag3. So the log scanner associated with DBFrag3 extracts and exports this data change, while the log scanner on DBFrag1 does not. Note that the database fragment DBFrag4 does not contain the data change and so would not be considered as a candidate database fragment by the DuplicateFilter function.

Some DuplicateFilter functions may overload certain computer nodes by frequently selecting logs associated with the computer nodes. For example, using Max( ) may overload those nodes which host database fragments with larger IDs, since the Max( ) function may most frequently select the log scanners on these nodes to extract and export data changes. To address this issue, in one embodiment, different DuplicateFilter functions may be used for different replication batches. For example, for the first batch, a Max( ) DuplicateFilter function may be used; for the second batch, a SecondLargest( ) DuplicateFilter function may be used, and so forth. In this way, the log scanners of database fragments hosting duplicates may take turns in extracting and exporting data changes.

In other embodiments, other DuplicateFilter functions may be used. For example, a DuplicateFilter function that takes a round-robin approach to selecting database fragment IDs may be used. As another example, a DuplicateFilter function may be used that distributes selections over database fragment IDs such that each database fragment ID is equally likely to be selected. As long as each log scanner can independently come up with the same database fragment ID for each data change, any DuplicateFilter function that distributes selection of database fragment ID may be used without departing from the spirit or scope of aspects of the subject matter described herein.

Based on the parameters of the duplicate schemas and the ID set of currently online database fragments, in one embodiment, all log scanners extract data changes independently without interactions among them during this process. All data changes exported from log scanners may be merged directly into a single data change stream, without the need to filter duplicates during merging.

If any log scanner reports a failure, the whole replication batch is cancelled, even if some log scanners have already successfully exported their data changes. Later, the same replication batch may be re-executed. During re-execution, those logs which have been scanned before may be re-scanned, possibly with a different parameter of the ID set of currently online database fragments, and/or with a different DuplicateFilter function.

In some embodiments, it may be more effective or desirable to send change information from all available logs to a node responsible for removing duplicates and providing a single data change stream. In such embodiments, the node responsible for removing duplicates may use information such as logical timestamp and ID of duplication schema to determine duplicates. As indicated previously, this information may be included or otherwise associated with change information includes in the logs.

Although the environments described above includes various numbers of the entities and related infrastructure, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 4:
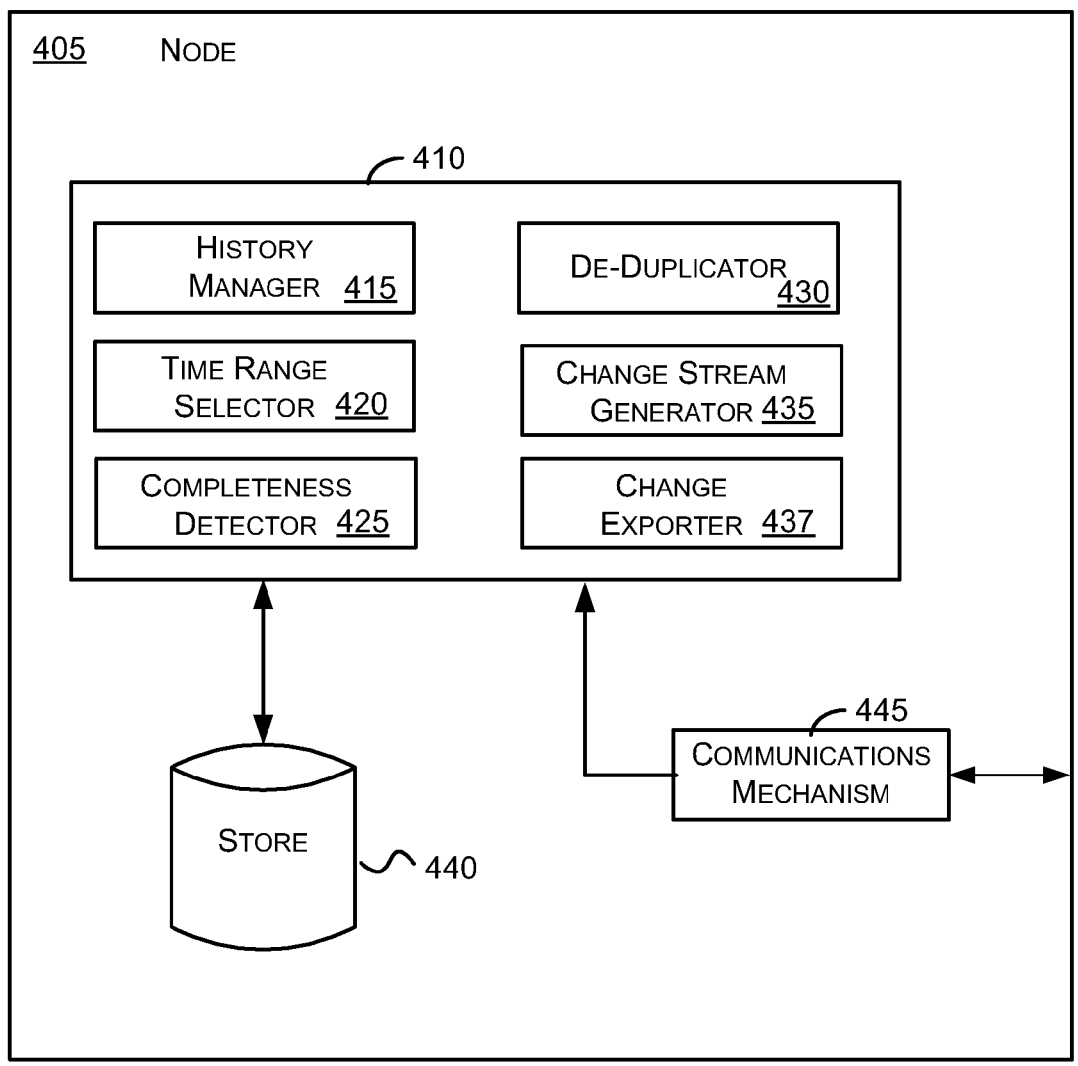
FIG. 4 is a block diagram that represents an apparatus configured in accordance with aspects of the subject matter described herein.

FIG. 4 is a block diagram that represents an apparatus configured in accordance with aspects of the subject matter described herein. The components illustrated in FIG. 4 are exemplary and are not meant to be all-inclusive of components that may be needed or included. In other embodiments, the components and/or functions described in conjunction with FIG. 4 may be included in other components (shown or not shown) or placed in subcomponents without departing from the spirit or scope of aspects of the subject matter described herein. In some embodiments, the components and/or functions described in conjunction with FIG. 4 may be distributed across multiple devices.

Turning to FIG. 4, the node 405 may include database components 410, a store 440, a communications mechanism 445, and other components (not shown). The node 405 may be implemented as a computer (e.g., as the computer 110 of FIG. 1).

The database components 410 may include a history manager 415, a time range selector 420, a completeness detector 425, a de-duplicator 430, a change stream generator 435, a change exporter 437, and other components (not shown). As used herein, the term component is to be read to include all or a portion of a device, one or more software components executing on one or more devices, some combination of one or more software components and one or more devices, and the like.

The communications mechanism 445 allows the node 405 to communicate with other nodes (e.g., the nodes 205-211 of FIG. 2). The communications mechanism 445 may be a network interface or adapter 170, modem 172, or any other mechanism for establishing communications as described in conjunction with FIG. 1.

The store 440 is any storage media capable of storing data. The store is operable to provide access to history information regarding duplication schemas. As mentioned previously, the history information includes time ranges in which the schemas are or were valid. The store 440 corresponds to the stores 215-221 of FIG. 2 and may be used in a similar way as the stores 215-221 as described previously.

The history manager 415 is a component operable to access the store 440 for the history information. The history manager 415 may update the history information to indicate when schemas are valid or invalid. The history manager 415 may also maintain a cache that includes the most recent times schemas were followed.

The time range selector 420 is operable to determine a time range for use in sending a batch of changes for synchronization with another database. The time range selector 420 may determine the time range based on number of changes within the time range, a pre-defined time interval (e.g., every 100 logical time units), activity of the database, other criteria, or the like.

The completeness detector 425 is operable to determine based on the history information and available logs whether the available logs include all changes made during the time range. The completeness detector 425 may use actions previously described to make this determination.

The de-duplicator 430 may be operable to determine whether a change from a log is to be exported, the de-duplicator may call a function that deterministically determines a single log from which a change is to be exported if two or more available logs include the change. Copies of this function may execute in parallel on multiple nodes such that the copies of the function independently determine a single node to extract the change information for a particular change. In one embodiment, the de-duplicator 430 may receive change information from each available log and may remove duplicates therefrom.

The change stream generator 435 is operable to create a single data stream for a batch of changes. The single data stream is ordered by logical times at which changes occurred to database records associated with the batch of changes.

The change exporter 437 is operable to export the change information to another database for use in updating the other database with the change information.

If the node 405 is not in charge of exporting changes to another database, the change stream generator 435 and the change exporter 437 may be omitted. In another embodiment, a node that does not host one of the database fragments may host the change stream generator 435 and the change exporter 437.

Figure 5:
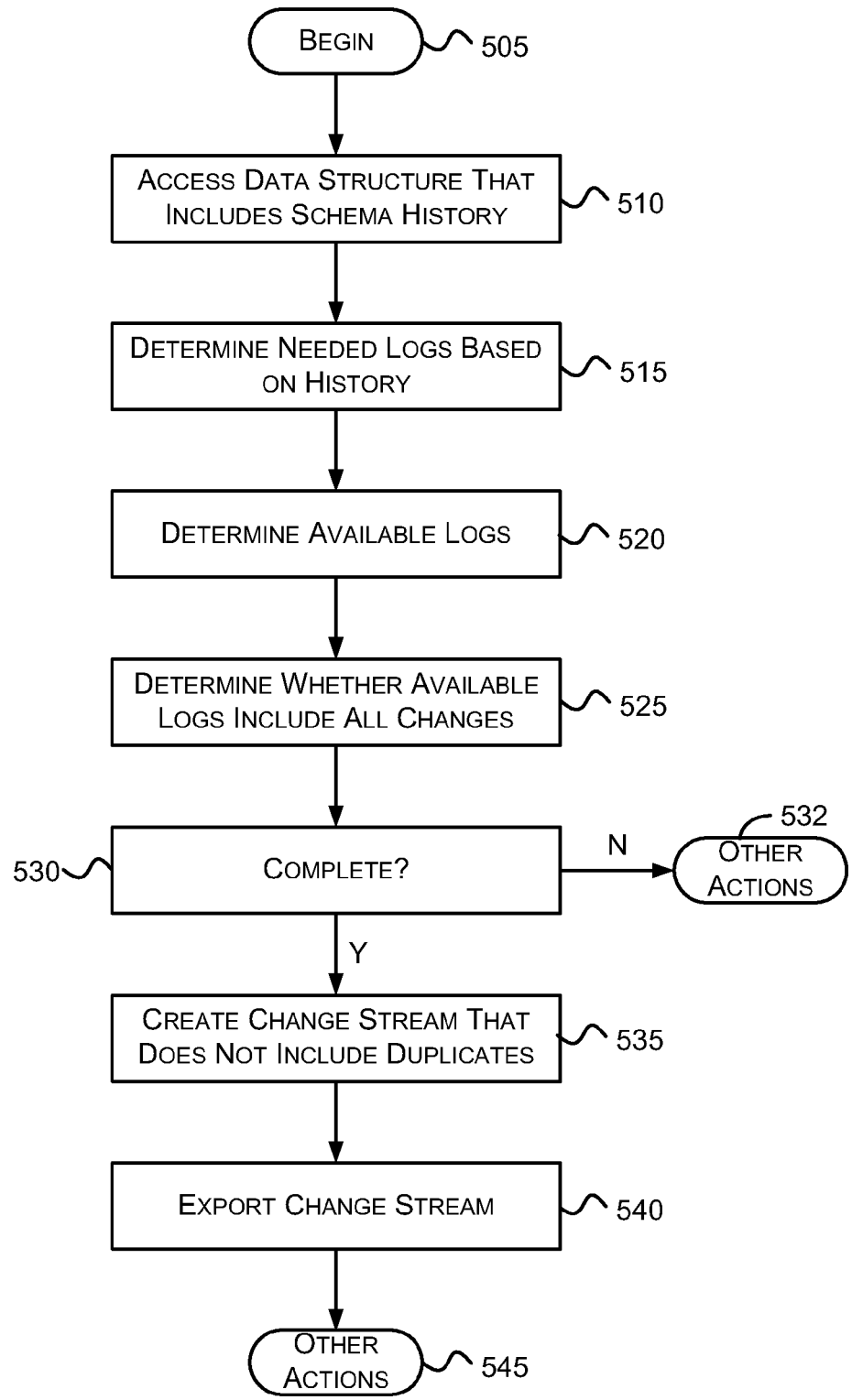
FIG. 5 is a flow diagram that generally represents exemplary actions that may occur in determining completeness in accordance with aspects of the subject matter described herein.
Figure 6:
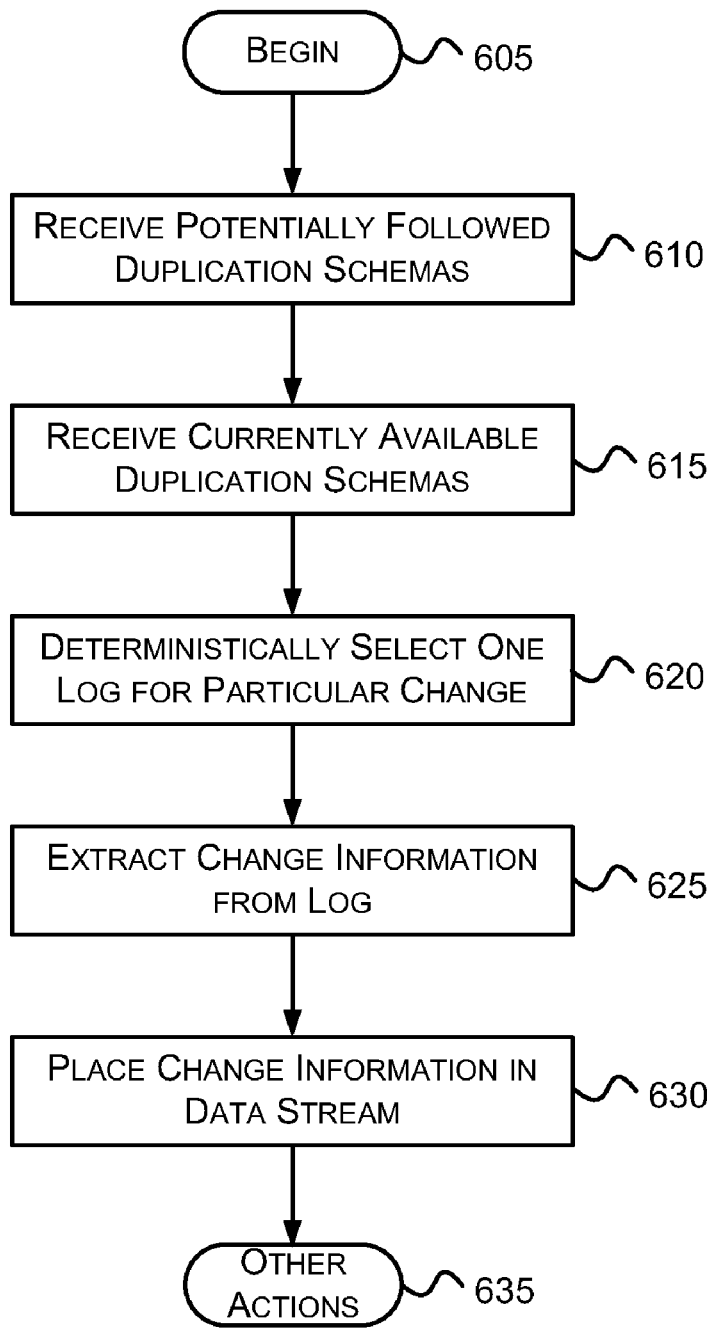
FIG. 6 is a flow diagram that generally represents exemplary actions that may occur in updating a remote database in accordance with aspects of the subject matter described herein.

FIGS. 5-6 are flow diagrams that generally represent actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 5 is a flow diagram that generally represents exemplary actions that may occur in determining completeness in accordance with aspects of the subject matter described herein. Turning to FIG. 5, at block 505, the actions begin.

At block 510, a data structure that includes a history of duplication schemas is accessed. For example, referring to FIG. 4, the data structure may be accessed from the store 440.

As indicated previously, each schema indicates a set of database fragments that duplicate one or more database records. Each database fragment is logically associated with its own log although physically one log may include the changes from multiple database fragments hosted by a single node. Each log indicates changes made, if any, in its associated database fragment or fragments. Furthermore, the history includes time ranges in which the schemas are or were valid.

At block 515, the set of logs that were potentially written to during the time range is determined. For example, referring to FIG. 4, the completeness detector 425 determines the set of logs that were potentially written to during the time range. The completeness detector 425 uses the history information to make this determination as previously described.

At block 520, the set of logs that are currently available is determined. For example, referring to FIG. 4, the completeness detector 425 may determine the logs that are currently available by determining which database fragments are currently online, for example.

At block 525, a determination is made as to whether the available logs include all changes made during the time range. This may be done via the logic previously described. For example, referring to FIG. 4, the completeness detector 425 may determine that the currently available logs are not complete if a most recent time of change is greater than or equal to the start time of the time range and if no log corresponding to the change is currently available.

At block 530, if the logs are complete, the actions continue at block 535; otherwise, the actions continue at block 532.

At block 532, other actions, if any, may be performed. For example, an error message may be sent that indicates that not enough logs are available to create a single data change stream.

At block 535, a change stream is created that does not include duplicates. For example, referring to FIG. 4, the change stream generator 435 may generate such a change stream. As mentioned previously, in one embodiment, components on each of the nodes of the available logs use a deterministic function to determine whether they are to extract particular changes from their logs. In another embodiment, a centralized node may receive available logs and may remove duplicates in create a single data change stream to be exported to another database.

At block 540, the change stream is exported to another database. For example, referring to FIG. 3, the change stream may be exported to the remote database(s) 310.

At block 545, other actions, if any, are performed.

FIG. 6 is a flow diagram that generally represents exemplary actions that may occur in updating a remote database in accordance with aspects of the subject matter described herein. Turning to FIG. 6, at block 605, the actions begin.

At block 610, an indication of duplication schemas that were potentially followed during a range of time is received. For example, referring to FIG. 2, each of the currently online nodes may receive a set of schema IDs that were potentially followed during a particular time range.

At block 615, an indication of a set of logs that are currently available is received. For example, referring to FIG. 2, each of the currently online nodes may receive a data structure that indicates the set of logs that are currently available. In cases where database fragments indicate whether logs are available, receiving a data structure that indicates the set of available database fragments is sufficient to know which logs are available.

At block 620, a function is applied that deterministically selects, for a particular change, one and only one log. The function may use (e.g., receives as input) the indication of duplication schemas that were potentially used and the indication of the set of logs that are currently available. For example, referring to FIGS. 2 and 4 the de-duplicator 430 of each online node may each apply a copy of a function that determines which of the nodes is to extract the change. The nodes may apply the function in parallel to determine which node is to extract each change.

At block 625, change information is extracted from the selected log. For example, referring to FIG. 2 if the database fragment on store 215 is selected for a change, the change may be extracted from the log on the store 215.

At block 630, the change information is placed in a data stream for use in updating another database. For example, referring to FIG. 4, the change stream generator 435 may collect and order data changes into a single data change stream for exporting to another database (e.g., the database(s) 310 of FIG. 3).

At block 635, other actions, if any, may be performed.

As can be seen from the foregoing detailed description, aspects have been described related to multi-log based replication. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
    accessing a data structure that includes a history of duplication schemas, each duplication schema indicating a set of database fragments that duplicate one or more database records, each database fragment logically associated with a log, at least two database fragments associated with different logs, each log including information that indicates changes made, if any, in its associated database fragment or fragments, the history including time ranges in which the duplication schemas were valid;
    determining, via the data structure, a set of logs that were potentially written to during a range of time of the time ranges in which the duplication schemas were valid, the range of time having a start time and an end time;
    determining a set of logs that are currently available;
    determining whether the set of logs that are currently available includes change information corresponding to the set of logs that were potentially written to during the range of time, the change information indicating changes that were made to the database fragments during the range of time;
    filtering duplicate data changes to obtain non-duplicative data changes including only one of each change from the change information indicating changes that were made to the database fragments during the range of time, the duplicate data changes being determined using logical timestamps and identifiers of the respective duplication schemas; and
    creating a single data change stream that includes the non-duplicative data changes.

2. The method of claim 1, wherein the history indicates a most recent time, if any, in which a duplication schema was followed.

3. The method of claim 2, wherein determining a set of logs that were potentially written to during a period of time comprises determining whether the most recent time is greater than or equal to the start time.

4. The method of claim 3, wherein determining whether the set of logs that are currently available includes change information corresponding to the set of logs that were potentially written to during the range of time comprises determining that the set of logs that are currently available is missing at least some of the change information if the most recent time is greater than or equal to the start time and if no log indicated by the duplication schema is in the set of logs that are currently available.

5. The method of claim 2, further comprising storing the most recent time in a cache that is periodically flushed to non-volatile memory.

6. The method of claim 5, further comprising updating the most recent time to a current time if data in the cache is lost before being flushed to non-volatile memory.

7. The method of claim 5, wherein accessing a data structure that includes a history of duplication schemas comprises accessing the cache and accessing history data stored on the non-volatile memory to obtain the most recent time.

8. The method of claim 1, further comprising obtaining the change information from one or more physical logs corresponding to the set of logs that are currently available, one of the physical logs including change information for all database records duplicated by a node.

9. The method of claim 1, further comprising if the set of logs that are currently available includes change information corresponding to the set of logs that were potentially written to during the range of time, then taking additional actions, comprising:
    receiving changes from the set of logs that are currently available;
    determining duplicate changes that are duplicated in two or more of the set of logs that are currently available; and
    exporting the single data change stream to another database, the single data change stream including only one of each change from the set of logs that are currently available.

10. A computer storage medium storing computer-executable instructions, which when executed perform actions, comprising:
    receiving an indication of duplication schemas that were potentially followed during a range of time in which the duplication schemas were valid, each duplication schema indicating a set of database fragments that duplicate one or more database records of a database;
    receiving an indication of a set of logs that are currently available, each log including information that indicates changes made, if any, in one or more database fragments associated with the log;
    applying a function that deterministically selects, for a particular change, one and only one log, the function using the indication of the duplication schemas and the indication of the set of logs;
    extracting change information from the one log for the particular change;
    filtering duplicate data changes from the set of logs that are currently available to obtain non-duplicative data changes including only one of each change from the change information, the change information indicating changes that were made to the one or more database fragments during the range of time, the duplicate data changes being determined using logical timestamps and identifiers of the respective duplication schemas; and placing the non-duplicative data changes including only one of each change from the change information in a single data change stream.

11. The computer storage medium of claim 10, wherein applying a function comprises applying a maximum function that selects a log associated with a database fragment having a largest identifier.

12. The computer storage medium of claim 10, wherein applying a function comprises applying a distributive function that distributes selections over the set of logs such that each log is equally likely to be selected.

13. The computer storage medium of claim 10, wherein receiving an indication of a set of logs that are currently available comprises receiving a set of identifiers of currently available database fragments associated with the logs that are currently available, each log being associated with one database fragment.

14. The computer storage medium of claim 10, wherein the single data change stream is ordered by logical times at which changes occurred to database records of the database.

15. The computer storage medium of claim 14, further comprising exporting the single data change stream for use in updating another database.

16. The computer storage medium of claim 10, wherein copies of the function execute in parallel on nodes that host the database fragments, such that the copies of the function independently determine a single node to extract the change information for the particular change.

17. In a computing environment, an apparatus, comprising:
at least one storage medium providing access to history information regarding duplication schemas, each duplication schema indicating a set of database fragments that duplicate one or more database records of a database, the history information including time ranges in which the duplication schemas were valid;
a history manager accessing the at least one storage medium for the history information;
a time range selector determining a time range for use in sending a batch of changes for synchronization with another database;
a completeness detector determining based on the history information and available logs whether the available logs include all changes made during the time range;
a de-duplicator receiving change information from the available logs and filtering duplicate data changes to obtain non-duplicative data changes including only one of each change from the available logs that include all changes made during the time range, the duplicate data changes being determined using logical timestamps and identifiers of the respective duplication schemas; and
a change stream generator creating a single data stream for the batch of changes, the single data stream including the non-duplicative data changes.

18. The apparatus of claim 17, wherein the de-duplicator determines whether a change from a log is to be exported, the de-duplicator calling a function that deterministically determines a single log from which a change is to be exported if two or more available logs include the change.

19. The apparatus of claim 17, wherein the database fragments and the available logs are distributed over multiple nodes.

20. The apparatus of claim 17, wherein the single data stream is ordered by logical times at which changes occurred to database records associated with the batch of changes.

* * * * *

UNITED STATES PATENT AND TRADEMARK OFFICE
CERTIFICATE OF CORRECTION

PATENT NO. : 8,108,343 B2
APPLICATION NO. : 12/428495
DATED : January 31, 2012
INVENTOR(S) : Rui Wang et al.

It is certified that error appears in the above-identified patent and that said Letters Patent is hereby corrected as shown below:

In column 4, line 1, after "bus" insert -- 121 --.

In column 4, line 4, after "bus" insert -- 121 --.

In column 4, line 10, after "drive" insert -- 141 --.

Signed and Sealed this
Twenty-seventh Day of March, 2012

David J. Kappos
*Director of the United States Patent and Trademark Office*